No. 637,518. Patented Nov. 21, 1899.
E. D. MEAD.
GRAIN AND SEED DISTRIBUTER.
(Application filed July 11, 1899.)

(No Model.) 3 Sheets—Sheet 1.

ATTEST:

INVENTOR:
Edwin D. Mead,
By Dodge and Sons,
Att'ys

No. 637,518. Patented Nov. 21, 1899.
E. D. MEAD.
GRAIN AND SEED DISTRIBUTER.
(Application filed July 11, 1899.)

No Model. 3 Sheets—Sheet 2.

ATTEST:
Ul. Bendure
J. M. Pond

Inventor:
Edwin D. Mead,
by Dodge and Sons
Attys.

No. 637,518. Patented Nov. 21, 1899.
E. D. MEAD.
GRAIN AND SEED DISTRIBUTER.
(Application filed July 11, 1899.)
No Model. 3 Sheets—Sheet 3.
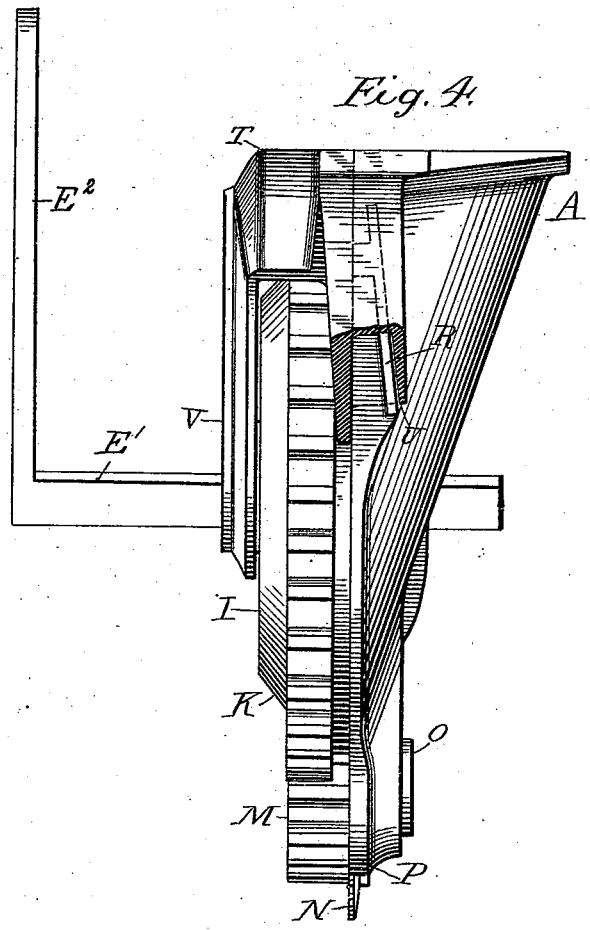
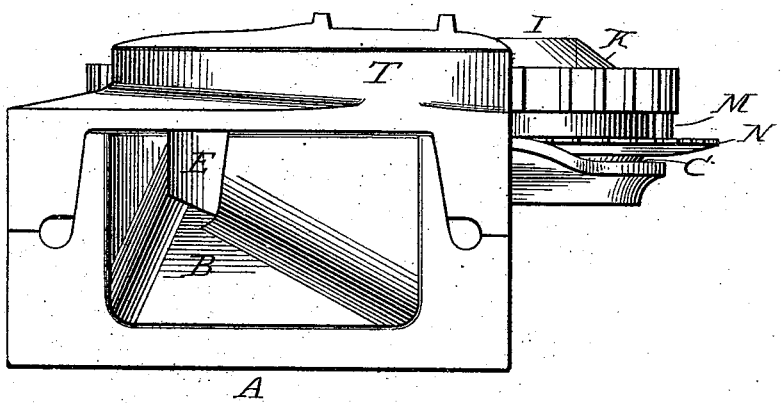
ATTEST:
INVENTOR:
Edwin D. Mead,
By Dodge and Sons,
Att'ys.

UNITED STATES PATENT OFFICE.

EDWIN D. MEAD, OF PHELPS, NEW YORK.

GRAIN AND SEED DISTRIBUTER.

SPECIFICATION forming part of Letters Patent No. 637,518, dated November 21, 1899.

Application filed July 11, 1899. Serial No. 723,484. (No model.)

*To all whom it may concern:*

Be it known that I, EDWIN D. MEAD, a citizen of the United States, residing at Phelps, in the county of Ontario and State of New York, have invented certain new and useful Improvements in Grain and Seed Distributers, of which the following is a specification.

My present invention pertains to improvements in grain and seed distributers, the construction and advantages of which will be hereinafter set forth, reference being had to the accompanying drawings, wherein—

Figure 1:
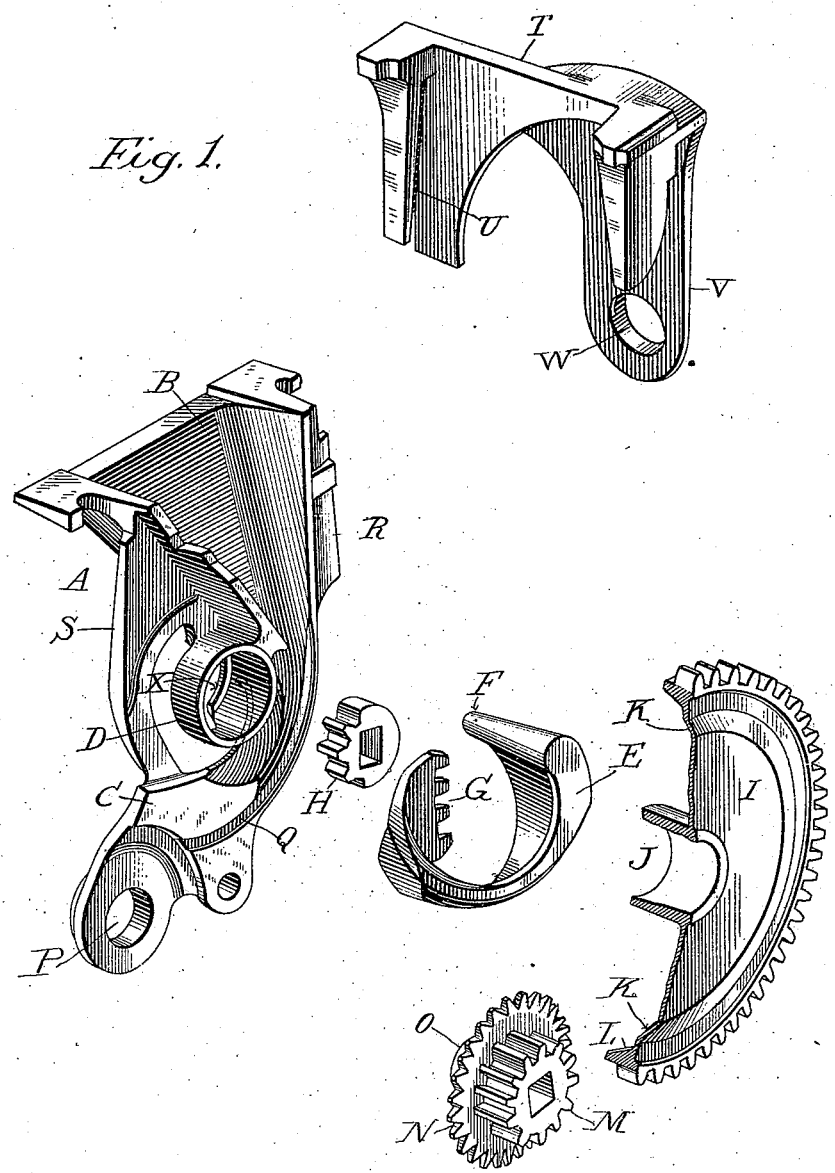
Figure 2:
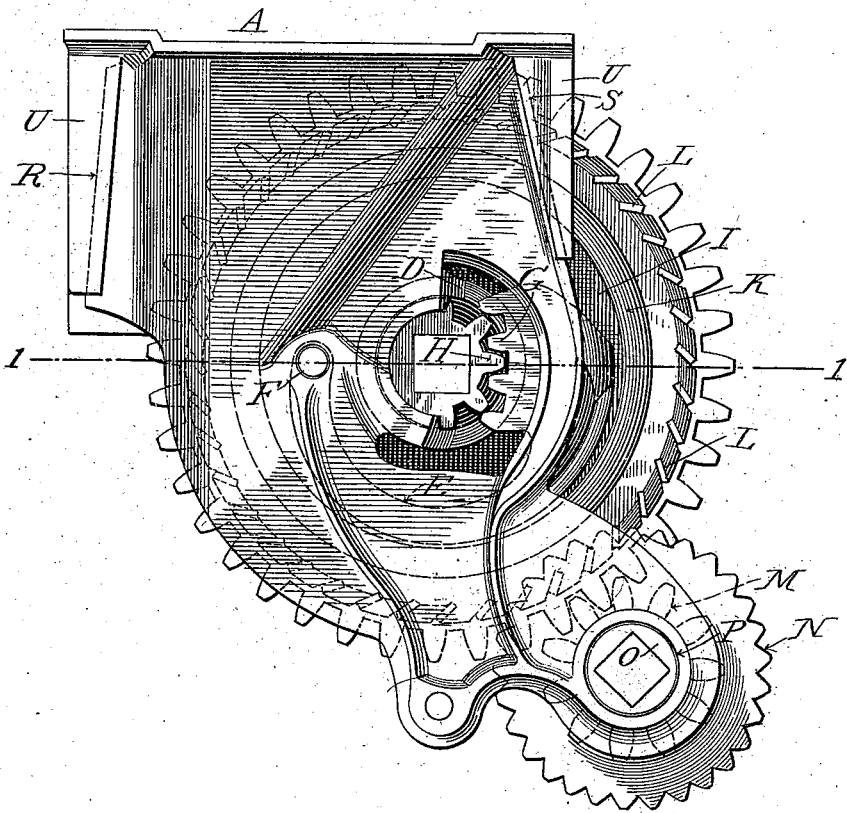
Figure 3:
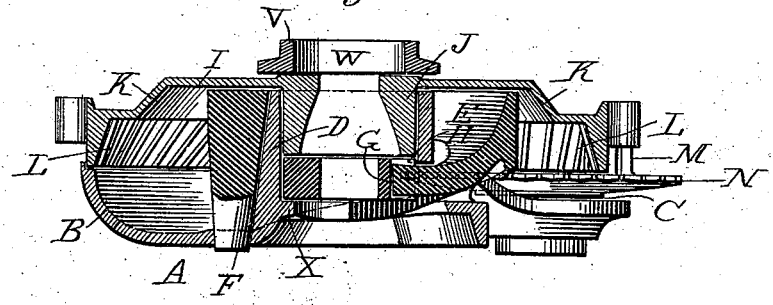

Figure 1 is a perspective view of the apparatus, the various parts being shown in a separated or detached condition; Fig. 2, a side elevation of the device as a whole; Fig. 3, a horizontal sectional view taken on the line 1 1 of Fig. 2; Fig. 4, a front face view, a portion of the device being broken away; and Fig. 5, a top plan view.

One object of my invention is to construct a grain and seed distributer wherein the use of bolts, rivets, screws, and the like is done away with and the parts are so made as to be held in position without these when once assembled.

Another object of my invention is to provide a peripheral drive for the feed wheel or disk.

Various other objects and advantages are present in the construction and will be hereinafter set forth in detail.

Referring to the drawings, A indicates the main body or casing of the distributer, formed with a channel or way B, which leads to the outlet or throat C. The casing is also provided with a central hub or bearing D, formed integral therewith and best illustrated in Fig. 1. As will be noted upon reference to said figure and to Fig. 3, the opening in the hub extends through from one side of the member A to the other. A gate E is pivoted in the casing at one side of said bearing member D and may be swung back and forth across the throat of the distributer to regulate the size thereof. This pivotal connection is brought about by forming an opening in the casing to one side of the central hub or bearing D, into which projects a stud F, extending out from one end of the gate, as is clearly illustrated in Fig. 3. The gate, as will be seen upon reference to Figs. 1 and 2, is substantially U-shaped, and the end thereof opposite the member F extends into the central hub or bearing member D. This end is provided with teeth G, which when the parts are assembled mesh with teeth formed upon a pinion H, seated loosely in the central hub or bearing D. The formation of the member A and the edge of the gate E which bears thereagainst is such that the gate will at all times and in whatever position it is left or to which it is adjusted bear directly against the face thereof and prevent the passage of the seed or grain between the two. A shaft E' is passed through the pinion H and is provided with an index-finger E², and by adjusting this shaft the gates in the various distributers may all be brought to the desired position and the feed of the seed regulated to a nicety.

The feed-wheel I is provided with a central hollow stud or axle J, which is of such size as to fit within the central hub or bearing member D, and when the parts are assembled to hold the pinion H in place, as will be clearly seen upon reference to Fig. 3. The feed-wheel is formed with an offset or shoulder K, while the outer flange of the wheel is formed with a series of ribs L upon its inner face. Upon the periphery or outer face of the flange there is formed a series of teeth, which when the parts are in position mesh with the corresponding teeth of a driving-pinion M. In the form illustrated said pinion is shown as made integral with a distributer or stirrer wheel or disk N. The combined pinion and distributer disk or wheel is provided with a hollow axle O, which is mounted in an opening P, formed at the lowermost end of the casing A.

The edge of the flange of the feed-wheel I preferably works in a groove or channel Q, formed in the face of the casing A, so that it at all times makes a close fit therewith and prevents the working out of the grain or seed between the two.

The casing A is made with a rib or flange R, which corresponds in form and position with a web S upon the opposite side of the casing.

T denotes the back or cover of the distributer, which is formed with ways or channels U, adapted when the parts are in position to embrace and fit around the flange R and the web S. The parts are so proportioned that the upper end of said flange R and web S will come into contact with the member T at the upper end of the slot and bring the upper face of the cover and the casing A into alinement. Cover T is provided with a downwardly-projecting arm V, which fits over the feed-wheel I, as is clearly shown in Fig. 4. It is also formed with an opening W in line with the opening formed in the pinion H and axle or bearing member J of the feed-wheel.

In assembling the parts gate E is first put in place and the pinion H dropped into the central hub or bearing member D, the pinion being kept from passing therethrough by an inwardly-extending web or flange X. The combined driving-pinion and stirrer-wheel are next put in place, and when this is done the feed-wheel I is placed in position. As before noted, the inner end of the hollow axle J of said feed-wheel comes into close proximity to the pinion H and keeps the same in position. It will also be noted that the feed-wheel tends to hold the gate from being withdrawn from its pivotal connection with the casing A. The proper position of the gate is also maintained by reason of the toothed end thereof projecting into the central hub or bearing D. After this the cover or member T is slipped down into position, its arm V, as before noted, extending down to one side of the feed-wheel and preventing the wheel from being withdrawn from its bearing. From this it will be seen that the parts are all securely held in position without the use of bolts, rivets, screws, or the like.

When the distributer as a whole is secured to the under side of the feed-box, the cover or member T will, of course, be held against any upward movement relatively to the main frame or casing A. Hence it is impossible to separate the parts.

The parts are driven by a shaft which passes through the pinion M, while a second shaft is passed through pinion H and affords a means for the regulation of the gate. It is of course essential that the opening in the axle J be large enough to permit the gate-regulating shaft to pass therethrough without coming in contact therewith.

While I have shown and described the pinion and stirrer-wheel as being formed integral, it is manifest that the two parts may be made separate without departing from the spirit of my invention. By making them integral and placing them in the same relative position to the feed-wheel multiplicity of shafting is avoided. It is also manifest that any construction of distributer wherein the parts are assembled and then interlocked together without the use of bolts, rivets, or the like falls within the scope of my invention, and I desire to be understood as claiming, broadly, any construction or combination of parts whereby this interlocking result is attained.

It is also apparent that the invention in its details may be modified in many respects.

By providing the feed-wheel with the offset or shoulder K the distributer is given a wide range of feed. By bringing the gate close down to the flange of the wheel it will be seen that the throat or discharge of the device will be quite restricted; but immediately the gate is elevated and brought back clear of the offset the grain will have a much freer and larger outlet. By driving the feed-wheel from its periphery instead of by a shaft passing centrally therethrough, as has heretofore been done, I am enabled to make the feed wheel or disk run much closer to the other parts of the apparatus. The peripheral drive also serves to take up the slack quicker, which slack always occurs in stopping a drill and starting it again, thus shortening the space or gap where the seed is not sown. Such drive also does away with the binding of the parts, which frequently happens where the feed disks or wheels are driven by a shaft passing centrally therethrough, for the reason that with such construction some of the disks would necessarily bind unless the shaft be absolutely straight and true.

Having thus described my invention, what I claim is—

1. In a force-feed grain and seed distributer, the combination of a feed wheel or disk provided with teeth upon its periphery, and a driving-pinion therefor meshing with said teeth.

2. In a force-feed grain and seed distributer the combination of a feed wheel or disk provided with teeth upon its outer edge; a driving-pinion meshing therewith; and a stirrer-wheel also driven by said pinion.

3. In a grain and seed distributer, the combination of a main frame or casing; operative parts mounted therein; and an interlocking plate or cover serving to hold the parts in their operative relation without the use of other fastening devices.

4. In a grain or seed distributer, the combination of a main frame or casing; a feed-wheel mounted thereon; a driving-pinion for said feed-wheel; and an interlocking cover adapted to be connected to said frame and to hold the parts in position without the use of bolts, rivets, or the like.

5. In a grain and seed distributer, the combination of a two-part frame or casing arranged to interlock when assembled; and operative mechanism adapted to be mounted in said casing and to be held thereby, substantially as described.

6. In a force-feed grain and seed distributer, the combination of a feed-wheel; a pinion for driving the same; and a stirrer-wheel formed integral with said pinion.

7. In a force-feed grain and seed distributer, a disk or feed-wheel provided with teeth upon its outer edge; a driving-pinion meshing with said teeth; a stirrer-wheel formed integral with said pinion; and a gate serving to regulate the feed of the distributer.

8. In a force-feed grain and seed distributer, the combination of a pivoted gate, and a pinion mounted centrally within the case of the distributer for regulating the position of the gate.

9. In a force-feed grain and seed distributer, the combination of a main frame or casing; a feed-wheel journaled centrally therein; a gate pivoted to one side of the journal-bearing of the wheel; and a pinion for actuating the gate, said pinion being placed in line with the journal of the wheel.

10. In a force-feed grain and seed distributer, the combination of a main frame or casing; a feed-wheel journaled therein and provided with a hollow journal or axle; a gate pivoted to one side of the bearing of the wheel; and a pinion serving to regulate the position of the gate, said pinion being located in line with the journal of the wheel, substantially as described.

11. In a force-feed grain and seed distributer, the combination of a frame or casing; a feed-wheel journaled therein, said wheel being provided with an offset or shoulder K, substantially as described; and a pivoted gate mounted intermediate the frame and the feed-wheel adapted and designed to swing across the inner face of the feed-wheel, substantially as described.

12. In a force-feed grain and seed distributer, the combination of a main frame or casing; a feed-wheel journaled therein, said wheel being provided with teeth upon its periphery, and an offset or shoulder K; a pivoted gate mounted intermediate said wheel and the casing; and a pinion meshing with the teeth upon the feed-wheel.

13. In a force-feed grain and seed distributer, the combination of a main frame or casing provided with a central hub or bearing member D; a gate E pivoted adjacent to said member and provided with teeth G upon its free end; a pinion H mounted within said central hub or bearing member, and meshing with the teeth G upon the gate; a feed-wheel provided with a hollow hub J adapted to enter said hub or bearing D; a driving-pinion for said feed-wheel; and a cover adapted to interlock with the main frame or casing and hold the parts in position.

14. In a force-feed grain or seed distributer, the combination of a main frame or casing provided with a central hub or bearing D, a gate pivoted adjacent thereto and provided with teeth upon its free end; a pinion H mounted within said central hub or bearing and meshing with the teeth upon the gate; a feed-wheel journaled in said central hub or bearing and provided with teeth upon its outer periphery; a combined pinion and stirrer-wheel, said pinion meshing with the teeth upon the feed-wheel; and a cover adapted to pass down to one side of the feed-wheel and to interlock with the main frame or casing, substantially as described.

15. In a force-feed grain-distributer, the combination of a pivoted gate; a pinion mounted centrally within the case of the distributer for moving said gate; and an actuating-shaft passing through said pinion.

16. In a force-feed grain-distributer, the combination of a pivoted gate mounted centrally within the shell or casing; an actuating-shaft passing centrally through said casing; and means for connecting said shaft and the gate.

In witness whereof I hereunto set my hand in the presence of two witnesses.

EDWIN D. MEAD.

Witnesses:
W. H. COMFORD,
GEO. WHITE.